United States Patent [19]

Katoh et al.

[11] Patent Number: 5,200,122
[45] Date of Patent: Apr. 6, 1993

[54] SURFACE ACTIVATING METHOD FOR THERMOPLASTIC RESIN MOLDED ARTICLES

[75] Inventors: Koichiroh Katoh, Abiko; Motomi Nogiwa, Zushi; Yoshiharu Iwasaki, Yokohama, all of Japan

[73] Assignee: Japan as represented by Director Science and Technology, and Nippon Petrochemicals Company, Limited, Tokyo, Japan

[21] Appl. No.: 768,511

[22] PCT Filed: Jan. 23, 1991

[86] PCT No.: PCT/JP91/00069

§ 371 Date: Nov. 25, 1991

§ 102(e) Date: Nov. 25, 1991

[87] PCT Pub. No.: WO91/11484

PCT Pub. Date: Aug. 8, 1991

[30] Foreign Application Priority Data

Jan. 23, 1990 [JP] Japan .................................. 2-11811

[51] Int. Cl.$^5$ .............................................. B29C 71/04
[52] U.S. Cl. .................................. 264/22; 425/174.4; 427/581; 427/558
[58] Field of Search .................. 264/22, 1.4, 25, 81, 264/83, 340, 343, 331.17; 425/174.4, 174.8 R; 427/38, 44

[56] References Cited

U.S. PATENT DOCUMENTS

| 3,522,076 | 7/1970 | Wright | 264/22 |
|---|---|---|---|
| 3,522,226 | 7/1970 | Wright | 264/22 |
| 4,247,496 | 1/1981 | Kawakami et al. | 264/22 |
| 4,528,346 | 7/1985 | Sugie et al. | 525/523 |
| 4,803,021 | 2/1989 | Werth et al. | 264/25 |
| 4,933,123 | 6/1990 | Yoshida et al. | 425/174.4 |
| 5,023,026 | 6/1991 | Yoshida et al. | 264/22 |
| 5,077,082 | 12/1991 | Katoh et al. | 264/22 |

FOREIGN PATENT DOCUMENTS

| 46-41117 | 12/1971 | Japan | 264/22 |
|---|---|---|---|
| 58-145745 | 8/1983 | Japan | 264/331.17 |
| 59-98141 | 6/1984 | Japan | 264/22 |
| 59-105053 | 6/1984 | Japan | 264/331.17 |
| 63-137930 | 6/1988 | Japan . | |
| 63-205358 | 8/1988 | Japan . | |
| 2061809A | 5/1981 | United Kingdom | 264/22 |

OTHER PUBLICATIONS

International Search Report PCT/JP91/00069.

Primary Examiner—Jeffery Thurlow
Attorney, Agent, or Firm—Scully, Scott, Murphy & Presser

[57] ABSTRACT

Surface characteristics of a molded article formed by a composition including a polypropylene resin, an engineering plastic and a functionalized polyolefin resin or a composition including the said composition and an inorganic filler or a rubbery substance incorporated therein can be improved without deteriorating such characteristics as rigidity, impact resistance, heat resistance, dimensional stability and moldability, by radiating an ultraviolet light not longer than 300 nm in wavelength to the molded article, the said functionalized polyolefin resin containing at least one member selected from the group consisting of carboxylic acid group-, carboxylic ester group- or acid anhydride group-containing monomers, epoxy group-containing monomers, hydroxyl group-containing monomers, amino group-containing monomers, alkenyl cyclic iminoether derivatives and polyfunctional monomers.

5 Claims, No Drawings

SURFACE ACTIVATING METHOD FOR THERMOPLASTIC RESIN MOLDED ARTICLES

The present invention relates to a surface activating method for molded articles of engineering plastics.

More particularly, the present invention is concerned with a surface activating method for a molded article well-balanced in rigidity, impact resistance, heat resistance, dimensional stability and moldability and comprising a composition which comprises a polypropylene, an engineering plastic, and a polyolefin resin functioning as a compatibilizer or a modifier and prepared by the reaction, addition or impregnation of at least one functional member selected from carboxylic acid group-, carboxylic ester group- or acid anhydride group-containing monomers, epoxy group-containing monomers, hydroxyl group-containing monomers, amino group-containing monomers, alkenyl cyclic iminoether derivatives, and polyfunctional monomers, or a composition which comprises the said composition and an inorganic filler or a rubbery substance incorporated therein.

Polypropylene resins are used for various molded articles because they are superior in moldability and chemicals resistance and are inexpensive. However, the use thereof is limited because polypropylenes involve problems in point of impact resistance, coatability, heat resistance and adhesive property.

On the other hand, engineering plastics such as polyamide resins and polyester resins are superior in heat resistance and mechanical characteristics, but are expensive and inferior in moldability, so are used after incorporation of various modifiers and additives therein.

Recently, studies have been made earnestly about polymer alloys comprising general-purpose resins such as polypropylene resins referred to above and engineering plastics also mentioned above, which polymer alloys are being used in various fields, including the fields of automobile parts, household electric products and electric devices.

In order to enhance the added value of these products there has been conducted surface coating, printing or plating, or lamination thereto of base materials such as woven and non-woven fabrics, foam, and leather, or implantation of feathers therein. However, such polymer alloys are inferior in coatability, adhesive property and printability, so generally require surface treatment or the use of a primer.

Heretofore, for the purpose of improving the coatability, etc. of molded articles there have been conducted surface treatments such as physical treatments, e.g. sandblasting, flame treating, corona discharge, and treatment using plasma, or chemical treatments, e.g. treatment using chromic acid mixture or solvent.

However, such conventional physical treating methods involve the following problems: ① the effect obtained is unsatisfactory, ② the treating speed is low and treating time is long, ③ the apparatus is large-scaled and the process is complicated, and ④ the method is not economical.

The foregoing chemical methods also involves problems; for example, ① environmental pollution, and ② a considerable burden required for the disposal of liquid wastes used such as chemicals and solvents.

Both such conventional methods involve the problem that the coatability, printability and adhesive property in the use of coating materials, inks, and adhesives and base materials are still unsatisfactory.

In view of the above-mentioned points the present invention aims at providing a surface treating and/or coating method for molded articles extremely superior in coatability, printability and adhesive property.

Having made extensive studies for achieving the above-mentioned object, the present inventors found out that surface characteristics of molded articles could be improved without deterioration in rigidity, impact resistance, heat resistance, dimensional stability and moldability. In this way we accomplished the present invention.

More specifically, in a first aspect of the present invention there is provided a surface activating method for a thermoplastic resin molded article, characterized by radiating an ultraviolet light not longer than 300 nm in wavelength to the molded article, the molded article being formed by a composition containing:
(A) a polypropylene resin,
(B) an engineering plastic, and
(C) a compatibilzer and/or a modifier.

In a second aspect of the present invention there is provided a surface activating method for a thermoplastic resin molded article, characterized by radiating an ultraviolet light not longer than 300 nm in wavelength to the molded article, the molded article being formed by a resin composition containing:
(A) 1-99 wt. % of a polypropylene resin;
(B) 99-1 wt. % of an engineering platic; and, based on 100 parts by weight of said components (A)+(B).
(C) 3-100 parts by weight of a polyolefin resin functionalized by at least one member selected from C1: carboxylic acid group-, carboxylic ester group- or acid anhydride group-containing monomers, C2: epoxy group-containing monomers, C3: hydroxyl group-containing monomers, C4: amino group-containing monomers, C5: alkenyl cyclic imino ether derivatives and C6: polyfunctional monomers.

In a third aspect of the present invention there is provided a surface activating method for a thermoplastic resin molded article, characterized by radiating an ultraviolet light not longer than 300 nm in wavelength to the molded article, the molded article being formed by a resin composition containing:
(A) 1-99 wt. % of a polypropylene resin;
(B) 99-1 wt. % of an engineering platic; further, based on 100 parts by weight of said components (A)+(B),
(C) 3-100 parts by weight of a polyolefin resin functionalized by at least one member selected from C1: carboxylic acid group-, carboxylic ester group- and acid anhydride group-containing monomers, C2: epoxy group-containing monomers, C3: hydroxyl group-containing monomers, C4: amino group-containing monomers, C5: alkenyl cyclic iminoether derivatives and C6: polyfunctional monomers;
(D) 5-150 parts by weight of an inorganic filler and/or
(E) 3-100 parts by weight of a rubbery substance.

The polypropylene resin used as component (A) in the present invention is a polypropylene homopolymer or a copolymer of propylene with another α-olefin. Examples of the α-olefin include ethylene, 1-butene, 4-methyl-1-pentene, 1-hexene, and 1-octene.

As examples of the engineering plastic used as component (B) in the present invention there are mentioned polystyrene resins such as polystyrenes, styrene/acrylonitrile copolymers, styrene/methyl methacrylate/acrylonitrile copolymer, α-methylstyrene/- styrene/acrylonitrile copolymer, ABS, MBS, AES, and AAS; polymethacrylate resins, polyacetal resins, polyamide resins, polycarbonate resins, polyphenylene ether resins, polyester resins, polysulfone resins, polyether sulfone resins, polyphenylene sulfide resins, polyether ether ketone resins, polyacrylate resins, polyamide-imide resins, polyimide resins, and fluorine resins. These may be used each alone or as mixtures.

The mixing ratio of the polypropylene (A) to the engineering plastic (B) is (A)/(B)=99~1/1~99.

The amount of component (A) and that of component (B) are selected according to for what purpose the resulting molded article is to be used. More particularly, if the poor heat resistance and impact resistance which are drawbacks of the polypropylene resin are to be remedied while retaining the features characteristic of the resin, the proportion of the polypropylene resin is in the range of 50 to 99 wt. %, preferably 60 to 95 wt. %.

Conversely, if the characteristic features of the engineering plastic are to be retained, the proportion thereof is in the range of 50–99 wt. %, preferably 60–95 wt. %.

A typical example of the compatibilizer or modifier used as component (C) in the present invention is a polyolefin resin containing at least one functional member selected from C1: carboxylic acid group-, carboxylic ester group- or acid anhydride group-containing monomers, C2: epoxy group-containing monomers, C3: hydroxyl group-containing monomers, C4: amino group-containing monomers, C5: alkenyl cyclic iminoether derivatives and C6: polyfunctional monomers. As examples of such polyolefin resin there are included a copolymer of two or more monomers comprising olefin(s) and at least one of the above monomers, a graft-modified resin obtained by grafting at least one of the above monomers to a polyolefin resin, and a thermoplastic resin compositions containing a polyolefin resin impregnated with at least one of the above monomers.

As examples of component (C)-C1: carboxylic acid group-, carboxylic ester group- or acid anhydride group-containing monomers, there are mentioned $\alpha,\beta$-unsaturated dicarboxylic acids such as maleic, fumaric, citraconic and itaconic acids, unsaturated monocarboxylic acids such as acrylic, mathacrylic, crotonic, vinylacetic and pentenoic acids, as well as esters and anhydrides of these $\alpha,\beta$-unsaturated dicarboxylic acids and unsaturated monocarboxylic acids.

As examples of component (C)-C2 epoxy group-containing monomers, there are mentioned glycidyl (meth)acrylate, acryl glycidyl ether, and vinyl glycidyl ether.

As examples of component (C)-C3: hydroxyl group-containing monomers, there are mentioned 1-hydroxypropyl (meth)acrylate, 2-hydroxypropyl (meth)acrylate, and hydroxypropyl (meth)acrylate.

As examples of component (C)-C4: amino group-containing monomers, there are mentioned dimethylaminoethyl (meth)acrylate, diethylaminoethyl (meth)acrylate and dibutylaminoethyl (meth)acrylate.

The alkenyl cyclic iminoether derivatives referred to above as (C)-C5 are those represented by the following structural formula:

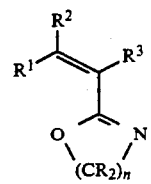

wherein n is 1, 2, or 3, preferably 2 or 3, more preferably 2, $R_1$, $R_2$, $R_3$ and R each represent an inert alkyl group having 1 to 12 carbon atoms and/or hydrogen. The alkyl group may contain an inert substituent group. The term "inert" as used herein means that no bad influence is exerted on the graft reaction and the function of the resulting product. It is not necessary for all of Rs to be the same. Preferable $R_1=R_2=H$, $R_3=H$ or Me, and R=H, that is, 2-vinyl and/or 2-isopropenyl-2-oxazoline and 2-vinyl and/or 2-isopropenyl-5,6-dihydro-4H-1,3-oxazine. These may be used each alone or as a mixture, with 2-vinyl and/or 2-isopropenyl-2-oxazoline being particularly preferred.

As examples of component (C)-C6: polyfunctional monomers, there are mentioned polyfunctional methacrylate monomers typified by trimethylolpropane trimethacrylate, ethylene glycol dimethacrylate, and diethylene glycol dimethacrylate; polyfunctional vinyl monomers typified by divinylbenzene, triallylisocyanurate, diallyl phthalate and vinyl butyrate; bismaleimides typified by N,N'-m-phenylenne bismaleimide and N,N'-ethylene bismaleimide; and dioximes such as p-quinone dioxime.

The compatibilizing agent used in the present invention is not specially limited if only it is such a functional group-containing olefin resin as exemplified above. For example, copolymers prepared by grafting such polymers as polystyrene and polyacrylate or such unsaturated monomers as styrene, acrylic acid ester, acrylonitrile and vinyl acetate to olefin polymers, e.g. ethyleneglycidyl methacrylate are also included as examples of the compatibilizing agent used in the invention.

In the case of grafting at least one of the above monomers to the polyolefin resin, it is desirable that this graft-modification be carried out in the presence of a cross-linking agent.

As the said crosslinking agent there may be used at least one member selected from organic peroxides such as hydroperoxides, dialkylperoxides, diacylperoxides, peroxyesters, and ketone peroxides, dihydroaromatic compounds, and vulcanizing agents such as sulfur.

The dihydroaromatic compounds just referred to above indicate compounds containing one or more aromatic rings at least one of which is dihydrogenated. The aromatic ring as referred to herein indicates a ring structure wherein the number of $\pi$- electrons is $4n+2$ (n is an integer), the $\pi$-electrons being shown in the definition of aromaticity [see, for example, "Yuki Kagaku-no Kiso," translated by Toshio Goto, Tokyo kagaku Donin (1976), pp. 105–106, (Richard S. Monosm & John C. Shelton, "Fundamentals of Organic Chemistry," MacGraw-Hill, Inc. (1974)]. Examples include pyridine and quinoline. Therefore, dihydroderivatives of quinoline are also included as examples of dihydroaromatic compounds empolyable in the invention. Further, the dihydroaromatic compounds employable in the invention may contain substituent groups. There may be used derivatives substituted with alkyl groups, various elements or functional groups.

Such dihydroaromatic compounds can be prepared by the application of known chemical reactions. Examples of those available at present include 1,2-dihydrobenzene, cis-1,2-dihydrocatechol, 1,2-dihydronaphthalene, 9,10-dihydrophenanthrene, as well as 1,2-dihydroquinoline compounds such as 6-decyl-2,2,4-trimethyl-1,2-dihydroquinoline, 6-ethoxy-2,2,4-trimethyl-1,2-dihydroquinoline, and 2,2,4-trimethyl-1,2-dihydroquinoline. Polymers of these compounds are also employable.

It is presumed that the dihydroaromatic compounds act on the carbon-hydrogen bond of the thermoplastic resin to form carbon radical and per se exhibit a resonant structure after release of the radical and are stabilized.

As compared with oxygen radical formed by the cleavage of the foregoing organic peroxides, the carbon radical just referred to above is weak in the hydrogen withdrawing ability from the carbon-hydrogen bond, so does not exhibit an extreme degradation reaction even for a peroxide decomposing type thermoplastic resin such as polypropylene, nor does it exhibit an extreme crosslinking reaction even for a peroxide crosslinking type thermoplastic resin such as polyethylene. Therefore, the control of reaction is easy and it is possible to effect a fine crosslinking which has been considered difficult in the use of an organic peroxide.

The crosslinking agent may be used directly as it is, but particularly in the case of a dihydroaromatic compound there may be adopted a method wherein the compound is prepared by a reaction during melt-kneading. The reaction may be selected optionally, but it is preferable that the reaction start from a compound which reacts easily on heating, in order to avoid the addition of the catalyst, etc. Particularly, Diels-Alder reaction is preferred. In this case, however, it is desirable that the compound used be in the form of a dihydroaromatic compound.

The amount of component (C) to be used is in the range of 3 to 100 parts by weight based on 100 parts by weight of the components (A)+(B). If the amount of component (C) is smaller than 3 parts by weight, it is impossible to expect the effect of the compatibilizing agent or the improvement of adhesive property and coatability, and an amount thereof exceeding 100 parts by weight is likely to result in deteriorated mechanical strength, etc.

As the inorganic filler (D) in the invention there may be used any of known ones such as powdered, plate-like, flaky, needle-like, spherical, hollow, and fibrous ones. Concrete examples include powdered fillers such as calcium carbonate, magnesium carbonate, calcium sulfate, siliceous sand calcium, clay, diatomaceous earth, talc, alumina, glass powder, iron oxide, metal powder, graphite, silicon carbide, silicon nitride, silica, boron nitride, aluminum nitride, and carbon black; metallic foils such as mica, glass plate, sericite, pyrophyllite, and alum flake; plate- or flake-like fillers such as graphite; hollow fillers such as Shirasu balloon, metal balloon and pumice; and mineral fibers such as glass fiber, carbon fiber graphite fiber whisker, metallic fiber, silicon carbide fiber, asbestos, and sollastonite.

These fillers may be used each alone or as mixtures. The kind and amount of the filler to be used may be determined according to purposes. For improving their dispersibility, the surfaces thereof may be treated with, for example, a silane coupling agent, an organotitanate-based coupling agent, or a metallic salt of a fatty acid.

The amount of the inorganic filler (D) to be used is in the range of 5 to 150, preferably 10 to 130, more preferably 20 to 120, parts by weight based on 100 parts by weight of the resin components (A)+(B).

If the amount of the inorganic filler is smaller than 5 parts by weight, the effect of the addition thereof will not be satisfactory, and if it exceeds 150 parts by weight, the mechanical strength, particularly the impact strength at low temperatures, will be deteriorated markedly.

As examples of the rubbery substance (E) used in the present invention there are mentioned ethylene-propylene random copolymer rubber, ethylene-propylene-diene random copolymer rubber, 1,2-polybutadiene, styrene-butadiene-styrene block copolymer rubber, styrene-isoprene-styrene block copolymer rubber, natural rubber, nitrile rubber, and isobutylene rubber. These may be used each alone or as mixtures. Particularly, ethylene-propylene random copolymer rubber and ethylene-propylene-diene random copolymer rubber are preferred.

As to the diene component in the ethylene-propylene-diene random copolymer rubber, any of conventional ones may be used, including ethylidene norbornene, 1,4-hexadiene and cyclopentadiene.

The amount of the rubbery substance (E) to be used is in the range of 3 to 100 parts by weight based on 100 parts by weight of the resin components (A)+(B). If the amount of the rubbery substance is smaller than 3 parts by weight, it will be impossible to exhibit the effect of its addition, and an amount thereof exceeding 100 parts by weight will result in deterioration of heat resistance, etc.

The molded articles of thermoplastic resins to which the present invention is applicable include primary, intermediate and final molded articles obtained using the composition described above by means of, for example, extrusion, injection molding, rotational molding, compression molding, or blow molding, such as, for example, films, sheets, plates, filaments, non-woven fabrics, pipes, vessels, dolls, special shapes, household electric products, and automobile parts such as bumper and instruments.

According to the surface treating and/or coating method of the present invention, a special ultraviolet light having a radiation wave length in the region not longer than 300 nm is radiated to a molded article to activate the surface of the molded article, thereby improving the adhesive property, printability and coatability of the surface.

The action of light applied to the surface of a molded article differs depending on the wave length of light, and the shorter the wave length, the more effective. It is desirable that the energy of light not longer than 300 nm, preferably shorter than 254 nm, in wave length occupy 85% or more of the entire energy. Ultraviolet light whose main operating wave length is near 185 nm is most preferable.

The material of an ultraviolet radiation lamp which produces an ultraviolet light having a main operating wave length near 185 nm is preferably one which is high in the transmissivity of ultraviolet rays of short wave lengths. This is attained by using a synthetic quartz glass whose purity is higher than that of natural quartz glass.

In the present invention, by using such an ultraviolet light of a short wave length, it is made possible to more activate the surface of a molded article and improve the coatability, adhesive property, etc.

At the time of radiating such ultraviolet light to the surface of a molded article, the surface may be treated with a solvent at room temperature or with a heated solvent, or the molded article may be heated and then treated with a solvent.

Into the composition used in the present invention there may be incorporated additives within the range not affecting the object of the present invention. Examples of such additives include antioxidants, heat stabilizers (e.g. hindered phenol, phosphite, hydroquinone and thioether compounds), ultraviolet ray absorbers (e.g. benzotriazole, resorcinol and salicylate compounds), dyes or pigments, flame-retardants, antistatic agents, nucleating agents (crystallization accelerating agents), lubricants, foaming agents, crosslinking accelerators, and mold release agents. Several of these additives may be used in combination.

According to the method of the present invention, as set forth above, it is possible to activate and thereby easily coat, bond and print surfaces of molded articles formed by polymer alloys of polypropylene resins and engineering plastics without requiring a surface treatment using solvent or plasma or a primer treatment, unlike the prior art. Particularly, it is possible to improve, easily in a single process, the coatability, printability and adhesive property of molded articles such as automobile parts for which the use of plastic material has recently become very popular, e.g. interior parts such as instruments, trims and pillars, and exterior parts such as bumper and fascia, as well as household electric products. Thus, a great industrial merit can be attained.

EXAMPLES

The following examples are given to illustrate the present invention more concretely, but it is to be understood that the invention is not limited thereby.

EXAMPLES 1-24 AND COMPARATIVE EXAMPLES 1-6

Thermoplastic resins (A), functional group-containing polyolefins (B), inorganic fillers (C) and rubbery substances (D) were mixed as shown in Table 1. Test pieces were prepared by injection-molding the resulting compositions followed by annealing, unless otherwise described.

How to prepare the compositions, conditions for preparing the test pieces by injection molding, and testing methods, are as follows.

Each plate (3 mm thick, 100×200 mm) obtained by injection molding was placed in front of an ultraviolet light radiating device equipped with low-pressure mercury vapor lamp (SUV-110, a product of Sen Tokushu Kogen K.K.), and then ultraviolet light was radiated thereto in an air atmosphere for 5 minutes while the distance between the light source and the molded plate surface was kept 5 cm. (The low-pressure mercury vapor lamp had been fabricated using a synthetic quartz having a light transmissivity at a wave length of 185 nm of not less than 85%.)

The thus surface-treated plate was coated with an acrylic coating material (manufactured by Shinto Toryo K.K.) by spraying. The resulting coating was dried for 24 hours or longer at room temperature and then cross-cut into 2 mm width. Cellophane tape was brought into pressure contact with the upper surface of the coating and then peeled off. The remaining area was regarded as adhesive property. The results obtained as set set forth in Table 1.

The following thermoplastic resins, functional group-containing polyolefins, inorganic fillers and rubbery substances were used.

A: Thermoplastic Resins
(A1) Polypropylene
  (trade name: Nisseki Polypro J650G, MFR=8.0, a product of Nippon Petrochemicals Co., Ltd.)
(A2) Polypropylene
  (trade name: Nisseki Polypro J150G, MFR=8.0, a product of Nippon Petrochemicals Co., Ltd.)
B: Engineering Plastics
(B1) 6-Nylon
(B2) Polybutylene terephathlate (PBT)
  (trade name: Valox 310, a product of Engineering Plastic K.K.)
(B3) Polyphenylene oxide
(B4) Polycarbonate
C: Functional Group-Containing Polyolefins
(C1 Acid-modified polyethylene
  (trade name: Nisseki N Polymer A1600, MFR=6.0, a product of Nippon Petrochemicals Co., Ltd.)
(C2) Ethylene - Glycidyl methacrylate copolymer
  (trade name: Nisseki Rexpearl RA, a product of Nippon Petrochemicals Co., Ltd.)
(C3) Ethylene - Hydroxyethyl methacrylate copolymer
(C4) Ethylene - Dimethylamino methacrylate copolymer
(C5) Oxazoline-modified polyethylene
(C6) Quinoline-modified polyester
D: Inorganic Fillers
(D1) Glass fiber
(D2) Talc
E: Rubbery Substances
(E1) Ethylene-Propylene-Diene random copolymer rubber
  (trade name: EP-57P, a product of Japan Synthetic Rubber Co., Ltd.)
(E2) Ethylene-Propylene random copolymer rubber
  (trade name: EP-07P, a product of Japan Synthetic Rubber Co., Ltd.)

TABLE 1

| | Composition | | | | | | | | | | | |
| | Component (A) | | Component (B) | | Component (C) | | Component (D) | | Component (E) | | Adhesion | |
| | Kind | Amount (wt %) | Kind | Amount (wt %) | Kind | Amount (part) | Kind | Amount (part) | Kind | Amount (part) | (%) | Remarks |
|---|---|---|---|---|---|---|---|---|---|---|---|---|
| Example 1 | A1 | 80 | B1 | 20 | C1 | 5 | | | | | 100 | |
| Example 2 | A1 | 60 | B1 | 40 | C1 | 5 | | | | | 100 | |
| Example 3 | A1 | 40 | B1 | 60 | C1 | 5 | | | | | 100 | |
| Example 4 | A2 | 80 | B1 | 20 | C1 | 5 | | | | | 100 | |
| Example 5 | A2 | 60 | B1 | 40 | C1 | 5 | | | | | 100 | |
| Example 6 | A2 | 40 | B1 | 60 | C1 | 5 | | | | | 100 | |
| Example 7 | A1 | 80 | B2 | 20 | C1 | 5 | | | | | 100 | |
| Example 8 | A1 | 60 | B2 | 40 | C1 | 5 | | | | | 100 | |
| Example 9 | A1 | 40 | B2 | 60 | C1· | 5 | | | | | 100 | |

TABLE 1-continued

| | Composition | | | | | | | | | | |
|---|---|---|---|---|---|---|---|---|---|---|---|
| | Component (A) | | Component (B) | | Component (C) | | Component (D) | | Component (E) | | |
| | Kind | Amount (wt %) | Kind | Amount (wt %) | Kind | Amount (part) | Kind | Amount (part) | Kind | Amount (part) | Adhesion (%) | Remarks |
| Example 10 | A1 | 80 | B3 | 20 | C1 | 5 | | | | | 100 | |
| Example 11 | A1 | 60 | B3 | 40 | C1 | 5 | | | | | 100 | |
| Example 12 | A1 | 40 | B3 | 60 | C1 | 5 | | | | | 100 | |
| Example 13 | A1 | 80 | B4 | 20 | C1 | 5 | | | | | 100 | |
| Example 14 | A1 | 60 | B4 | 40 | C1 | 5 | | | | | 100 | |
| Example 15 | A1 | 40 | B4 | 60 | C1 | 5 | | | | | 100 | |
| Example 16 | A1 | 80 | B1 | 20 | C2 | 5 | | | | | 100 | |
| Example 17 | A1 | 80 | B1 | 20 | C3 | 5 | | | | | 100 | |
| Example 18 | A1 | 80 | B1 | 20 | C4 | 5 | | | | | 100 | |
| Example 19 | A1 | 80 | B1 | 20 | C5 | 5 | | | | | −100 | |
| Example 20 | A1 | 80 | B1 | 20 | C6 | 5 | | | | | 100 | |
| Example 21 | A1 | 80 | B1 | 20 | C1 | 5 | D1 | 30 | | | 100 | |
| Example 22 | A1 | 80 | B1 | 20 | C1 | 5 | D2 | 30 | | | 100 | |
| Example 23 | A1 | 80 | B1 | 20 | C1 | 5 | D1 | 30 | E1 | 20 | 100 | |
| Example 24 | A1 | 80 | B1 | 20 | C1 | 5 | D1 | 30 | E2 | 20 | 100 | |
| Comparative Example 1 | A1 | 80 | B1 | 20 | C1 | 5 | | | | | 0 | not irradiated |
| Comparative Example 2 | A1 | 60 | B1 | 40 | C1 | 5 | | | | | 5 | not irradiated |
| Comparative Example 3 | A1 | 40 | B1 | 60 | C1 | 5 | | | | | 21 | not irradiated |
| Comparative Example 4 | A1 | 80 | B2 | 20 | C1 | 5 | | | | | 0 | not irradiated |
| Comparative Example 5 | A1 | 80 | B3 | 20 | C1 | 5 | | | | | 0 | not irradiated |
| Comparative Example 6 | A1 | 80 | B4 | 20 | C1 | 5 | | | | | 0 | not irradiated |

A1: PP (J650G)
A2: PP (J150G)
B1: 6-Nylon
B2: PBT
B4: PPO
B5: PC
C1: MAn-modified
C2: Et-GMA
C3: Et-HEMA
C4: Et-DMAM
C5: Oxazoline-modified
C6: Quinoline-modified
D1: Glass fiber
D2: Talc
E1: EPDM (EP-57P)
E2: EPR (EP-07P)

What is claimed is:

1. A method for activating the surface of a thermoplastic resin molded article comprising radiating the surface of a thermoplastic resin molded article with ultraviolet light no longer than 300 nm in wavelength, said molded article formed of a resin composition including (A) 1% to 99% by weight of a polypropylene resin; (B) 1% to 99% by weight of an engineering plastic, said engineering plastic selected from the group consisting of polystyrene resins, polymethacrylate resin, polyacetal resin, polyamide resins, polycarbonate resins, polyphenylene ether resins, polyester resins, polysulfone resins, polyether sulfone resins, polyphenylene sulfide resins, polyether ether ketone resins, polyacrylate resins, polyamide-imide resins, polyimide resins, fluorine resins and mixtures thereof; and (C) 3 to 100 parts by weight, based on 100 parts by weight of said components (A) and (B), of a polyolefin resin functionalized by at least one member selected from the group consisting of carboxylic acid group-containing monomers, carboxylic ester group-containing monomers, acid anhydride group-containing monomers, epoxy group-containing monomers, hydroxyl group-containing monomers, amino group-containing monomers, alkenyl cyclic iminoether derivatives and polyfunctional monomers.

2. A surface activating method as set forth in claim 1 wherein said resin composition further includes (D) 5 to 150 parts by weight, based on 100 parts by weight of said components (A) and (B), of an inorganic filler and/or (E) 3 to 100 parts by weight, based on 100 parts by weight of said resin components (A) and (B), of a rubbery substance.

3. A surface activating method as set forth in claim 1, or claim 2, wherein the functionalization of the polyolefin resin is performed by graft modification, random copolymerization, or impregnation.

4. A surface activating method as set forth in claim 1 wherein said resin composition comprises from 50% to 99% by weight of component (A).

5. A surface activating method as set forth in claim 1 wherein said resin composition comprises from 50% to 99% by weight of component (B).

* * * * *